US005467264A

United States Patent [19]

Rauch et al.

[11] Patent Number: 5,467,264

[45] Date of Patent: Nov. 14, 1995

[54] METHOD AND SYSTEM FOR SELECTIVELY INTERDEPENDENT CONTROL OF DEVICES

[75] Inventors: Adam Rauch, Seattle; Gregory W. Riker, Woodinville; Nathan P. Myhrvold, Bellevue, all of Wash.

[73] Assignee: Microsoft, Redmond, Wash.

[21] Appl. No.: 129,685

[22] Filed: Sep. 30, 1993

Related U.S. Application Data

[63] Continuation of Ser. No. 85,447, Jun. 30, 1993.

[51] Int. Cl.[6] .......... G06F 15/46

[52] U.S. Cl. .......... 364/141; 364/188

[58] Field of Search .......... 364/140–146, 364/138, 139, 188–192; 340/310 A, 310 R

[56] References Cited

U.S. PATENT DOCUMENTS

| | | | |
|---|---|---|---|
| 4,217,646 | 8/1980 | Caltagirone et al. | 340/310 R |
| 4,418,333 | 11/1983 | Schwarzbach et al. | 364/146 |
| 4,710,863 | 12/1987 | Kaufman | 364/146 |
| 5,144,548 | 9/1992 | Salandro | 364/138 |

OTHER PUBLICATIONS

Frox System Owner's Manual.
The FroxSystem™ Home Theater.
Frox™ The First Vision of the Inevitable.

*Primary Examiner*—Roy N. Envall, Jr.
*Assistant Examiner*—Thomas E. Brown
*Attorney, Agent, or Firm*—Seed and Berry

[57] ABSTRACT

A computer method and system for providing a user with selectively interdependent control of devices. The devices include lamps, video cameras, motion detectors, and so forth. An identification of a first device and a second device is obtained from the user. A definition of a dependency relationship is then obtained from the user wherein the second device has a status which depends on a status of the first device. The status of the first device is continually monitored. When the status of the first device changes, the status of the second device is updated in accordance with the dependency relationship defined by the user. The second device is then activated or deactivated based on the updated status of the second device. Any number of devices are controlled in this fashion.

28 Claims, 7 Drawing Sheets

METHOD AND SYSTEM FOR SELECTIVELY INTERDEPENDENT CONTROL OF DEVICES

CROSS-REFERENCE TO RELATED APPLICATION

This application is a continuation of U.S. patent application Ser. No. 08/085,447, filed Jun. 30, 1993.

TECHNICAL FIELD

The present invention relates to the field of computer systems and, more particularly, to an automated device control system.

BACKGROUND OF THE INVENTION

It is known to provide automated control of a home device such as an appliance, an electric light, or the like. Such automated control is typically provided by an electronic mechanism which activates or deactivates the home device based on a time of day. The time of day is measured by the electronic mechanism and compared to a time range set by the user. Where multiple electronic mechanisms are applied, it is possible to control corresponding multiple home devices in such a fashion. However, control of each home device is independent of the control of the other home devices. That is, the user cannot set the electronic mechanism controlling one home device to depend on whether other home devices are activated or deactivated.

SUMMARY OF THE INVENTION

The present invention provides a computer method and system for providing a user with selectively interdependent control of devices. The devices include lamps, video cameras, motion detectors, and so forth. A user interface program is performed by a computer which provides a user interface. An identification of a first device and a second device is obtained from the user via the user interface. A definition of a dependency relationship is then obtained from the user via the user interface. The dependency relationship is defined such that the second device has a status which depends on the status of the first device. The status of a device is either ON or OFF, indicating that the device is either activated or deactivated, respectively. The status of the first device is stored by the computer and is continually monitored. When the status of the first device changes, the status of the second device is updated in accordance with the dependency relationship previously defined by the user. The second device is then activated or deactivated depending on the updated status. For example, the user defines a lamp to depend on a motion detector, such that the lamp is activated whenever the motion detector is activated.

Any number of devices are defined by the user and controlled by the method and system described above. The devices include lights, video cameras, motion detectors, and so forth. Virtual devices can also be defined by the user. For example, any number of "timers" are defined by the user. A timer has a status which depends on the time of day. The status of the physical devices, hereinafter referred to simply as devices, may depend on the status of timers, the status of other devices, or a combination of both. The devices and timers are identified by a user via a graphical user interface provided by the computer. The user defines each device or timer by selecting a graphic object which represents the device, such as an icon. The graphic object is displayed to the user on a display screen by a display connected to the computer. The user defines interdependencies between two previously selected devices by providing a graphic connector between the graphic objects, such as an arrow. The graphic connector represents a dependency relationship between the two devices. The user similarly defines a dependency relationship between a previously selected timer and a previously selected device.

Once defined, the devices are controlled by a device control program executing on the computer which maintains the status of each device and activates or deactivates the devices accordingly. A device status table is provided by the computer which has an entry for each device. The entry for each device contains a device condition field. The device condition field contains an identification of timers and/or devices with which the device has a dependency relationship. For example, the device condition field contains an identification of all devices the status of the device depends on. Alternatively, the device condition field contains an identification of all devices having a status affected by the status of the device. This dependency relationship has been previously defined by the user in the manner described above. The entry for each device also contains a device status field which stores the status of the device. The status in the status field depends on the status of the timers and devices contained in the condition field.

A timer status table is also provided by the computer. The timer status table has an entry for each timer defined by the user. The entry for each timer contains a timer condition field. The timer condition field contains a time range defined by the user on which the status of the timer depends. The entry for each timer also contains a timer status field which stores the status of the timer. The status in the timer status field depends on whether the time of day falls within the time range stored in the timer condition field. The time of day is indicated by a clock/calendar circuit provided by the computer. Alternatively, the entry for each timer in the timer status table and for each device in the device status table can be maintained in a same table. As mentioned above, timers are "virtual" devices, although referred to separately from the physical devices, which are called simply "devices."

The device control program continually monitors the status of the timers and devices to determine whether the status of each has changed. The status of a timer changes when the time of day changes into or out of the time range stored in the timer condition field. The status of a device changes when the status of devices or timers in the device condition field change. The status of a device also changes when a device sends a signal to the computer indicating that it has become activated or deactivated. As noted above, the device condition field for each device contains, for example, an identification of all devices the status of the device depends on. The device control program checks the device status fields in the device status table to determine the status of the devices and continually checks the timer status fields in the timer status table to determine the status of the timers. When the device control program determines that the status of a timer or device has changed, the device control program searches the device status table. The device control program locates all entries with a device condition field containing an identification of the device having the status that has changed. For each located entry, the status of the device is then updated and the updated status is stored in the device status field.

Alternatively, the device condition field for each device may contain an identification of all devices having a status affected by the status of each device. In this case, it is not necessary to search through the device status table to determine which devices are affected by the status change. Instead, the entry for the device having the changed status is located and all affected devices are identified in the device condition field. The status of each identified device is then updated.

When the status of a device is updated, the device is activated or deactivated by providing the updated status to the device. A transmitter is provided which transmits a signal over a medium such as infrared, radio frequency, or the like. Multiple transmitters may optionally be provided, each transmitting a signal over a different medium. A transmitter driver program is provided for each transmitter. When the device control program determines that the device is to be activated or deactivated, the device control program performs the transmitter driver program provided for the transmitter which communicates with that device. The transmitter driver program locates an entry for the device in a device command table which contains a digital waveform corresponding to a signal required to send the updated status to the device. The digital waveform is then provided to the transmitter which communicates with that device. The transmitter transmits to the device a signal corresponding to the digital waveform provided to thereby activate or deactivate the device.

DETAILED DESCRIPTION OF THE INVENTION

The present invention provides a computer method and system for providing a user with selectively interdependent control of devices. The user defines to the computer a number of devices such as lamps, video cameras, and motion detectors. Once the devices are defined, the user selectively defines interdependencies among the devices. For example, the user defines a lamp to depend on a motion detector such that the lamp is activated whenever the motion detector is activated. The devices are thereafter controlled by the computer in accordance with the interdependencies defined by the user. The computer monitors the status of each device and determines when the status of a device changes. When the status changes, the status is updated of all devices which depend on that device. The devices are then activated or deactivated based on the updated status.

Figure 1:
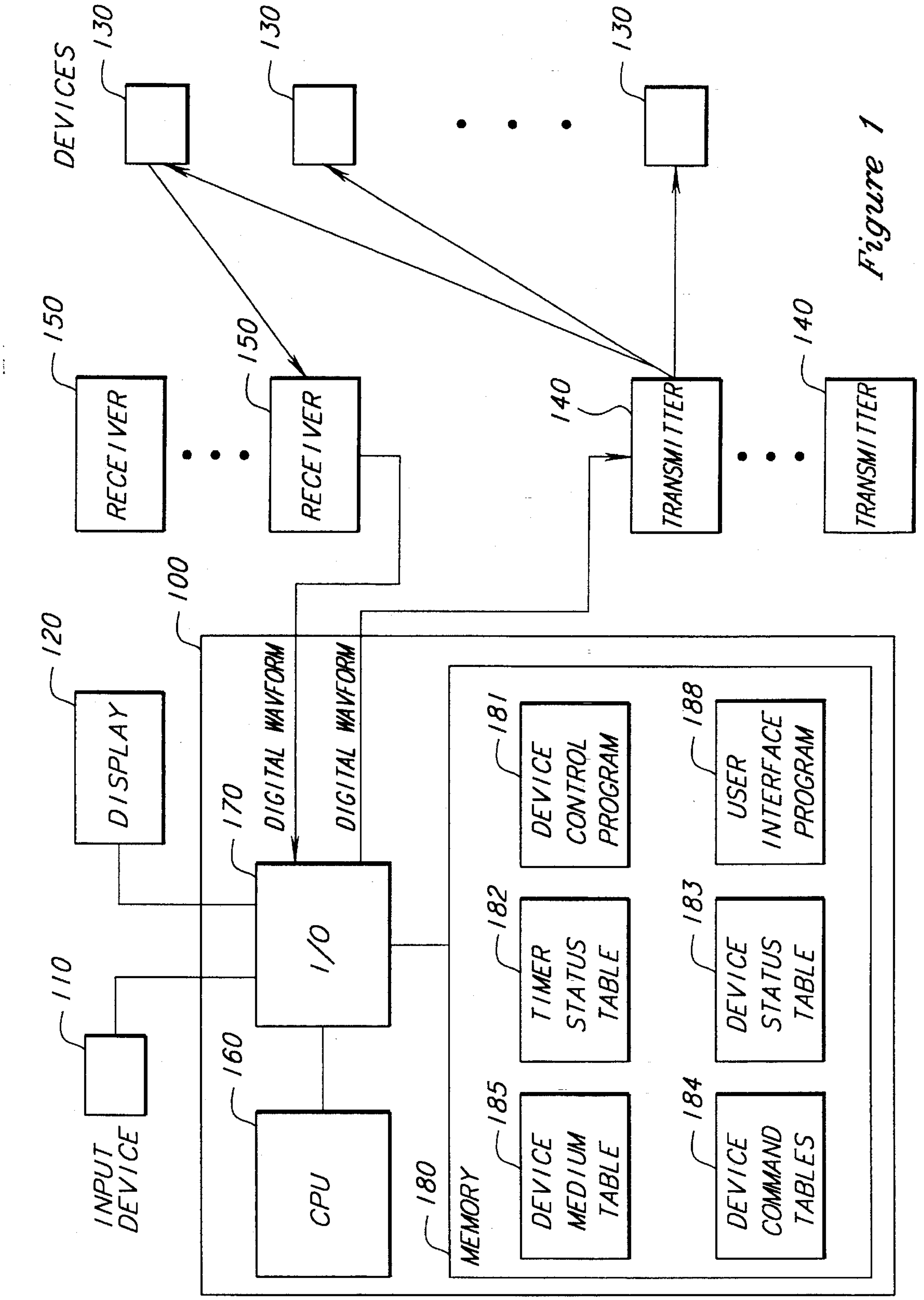
FIG. 1 is a block diagram of a computer system of the present invention.

A block diagram of the computer system of the present invention is illustrated in FIG. 1. The computer system includes a computer 100 connected to an input device 110 and a display 120. The computer 100 communicates with a set of devices 130. The devices 130 are physical devices which include lamps, video cameras, motion detectors and so forth. As will be explained below, the computer 100 also defines "virtual" devices, such as "timers" which have a status depending on the time of day. These timers will be referred to separately from the physical devices, which will be referred to below as the devices 130. The computer 100 communicates with the devices 130 through one or more transmitters 140 and one or more receivers 150. Although illustrated separately, it should be understood that the transmitters 140 and receivers 150 can be provided on a same motherboard as the computer 100 or on a separate board attached to the motherboard. The computer 100 controls the devices 130 based on input from the user via the input device 110. The input device 110 is a mouse, keyboard, pen or the like. The user uses the input device 110 to define the devices 130 and interdependencies between the devices 130. The computer 100 thereafter automatically controls the devices 130 based on the dependency relationship defined by the user. That is, when the motion detector indicates to the computer 100 via the receiver 150 that the motion detector has been activated, the computer sends a signal to the lamp via the transmitter 140 to activate the lamp. In accordance with the present invention, any number of such dependency relationships can be defined by the user. The change in status of one device can cause many other devices to change status based on the user-defined interdependencies. Similarly, the status of one device can be changed based on the change in status of any one of many other devices.

The present invention provides a graphical user interface to the user for defining the devices 130 and for defining the interdependencies between the devices 130. The graphical user interface is realized by executing a user interface program 188 stored in the memory 180 of the computer 100. When the user interface program 188 is executed, the display 120 displays the display screen 200 shown in FIG. 2. The display screen 200 includes a device representation area 210 and a device control menu 220. Using the device control menu 220, the user creates a device layout 212 in the device representation area 210. The device layout 212 is created by the user to illustrate an environment in which the devices 130 are provided. For example, a user implementing the invention to control home devices illustrates with the device layout 212 a schematic diagram of the home in which the devices are provided. The user then selects any number of graphic objects 214 from the device control menu 220. Each of the graphic objects 214 represent one of the devices 130. A graphic object 214 is, for example, an icon which illustrates the selected device, such as an illustration of a video camera representing a selected video camera, an illustration of a light bulb representing a selected lamp, and so forth.

Figure 2:
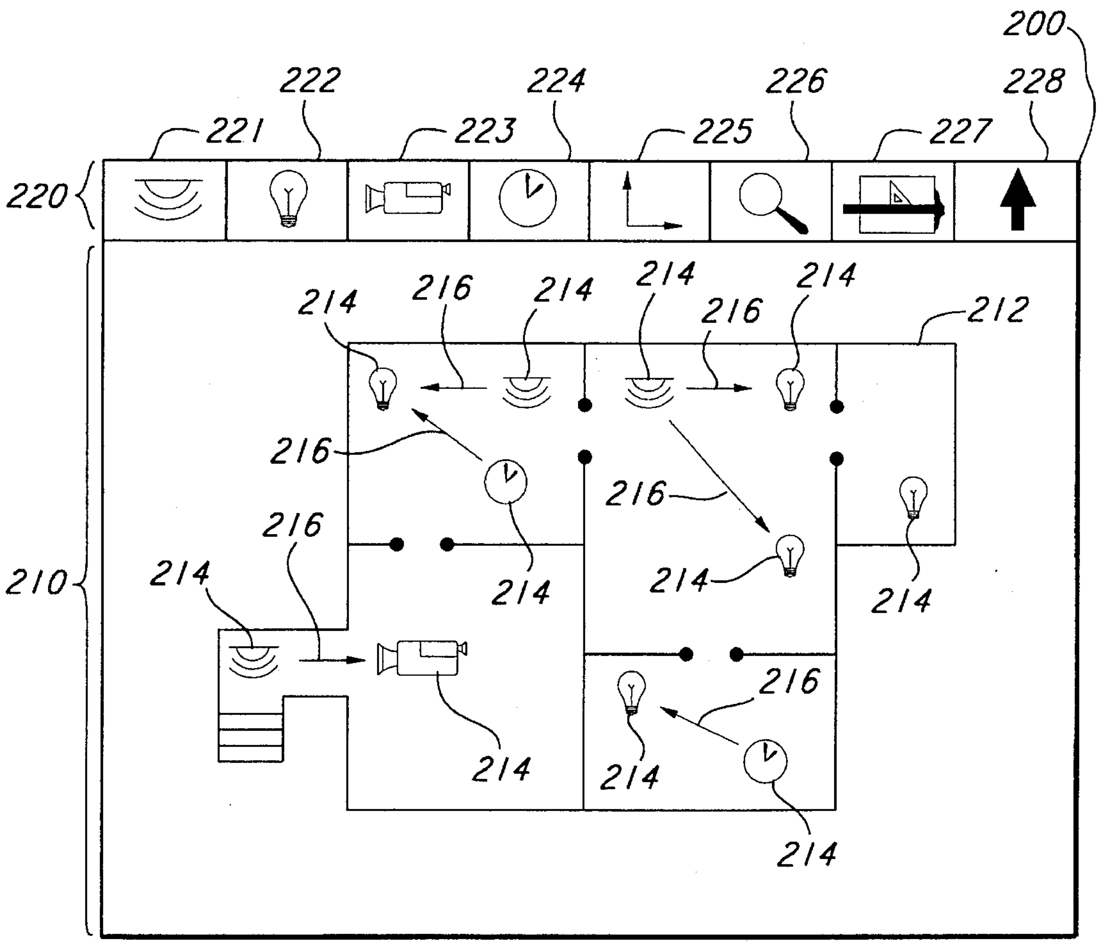
FIG. 2 is an illustration of a display screen displayed by the display of the computer system of FIG. 1.

When the user selects a graphic object 214 from the device control menu 220, the user then positions the graphic object in the device layout 212. By doing this, the user updates the device layout 212 to illustrate the selected devices 130. The user then selects any number of graphic connectors 216 to indicate a dependency relationship between selected ones of the devices 130. The graphic connectors are, for example, graphic representations of arrows to be drawn between graphic objects 214 in the device layout 212, as shown in FIG. 2. Each of the arrows points from a first graphic object to a second graphic object. The first graphic object represents a selected device having a status on which a different selected device represented by the second graphic object depends. The selected graphic connectors 216 are displayed in the device layout 212 in the device representation area 210.

Figure 3:
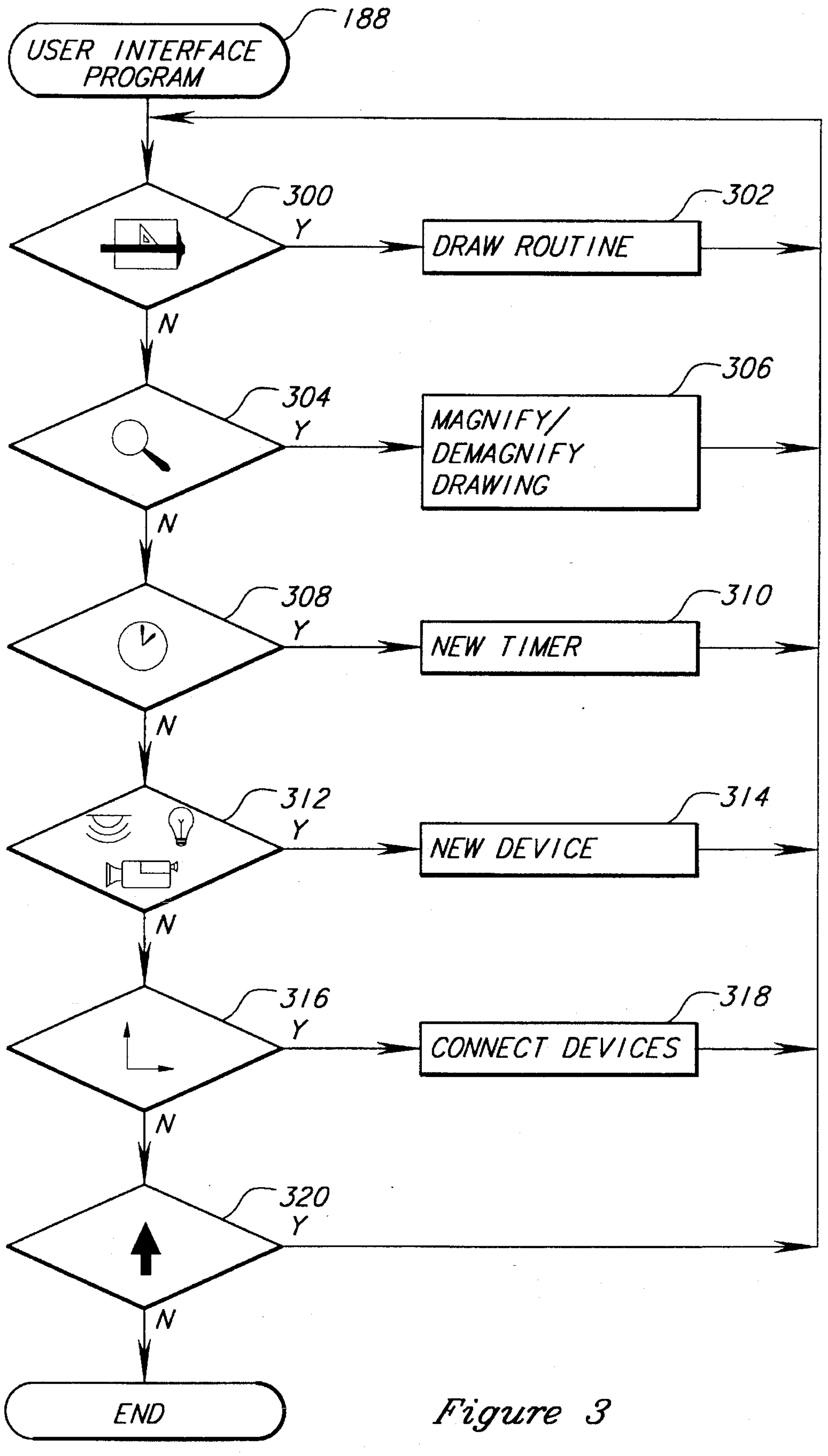
FIG. 3 is a flow diagram of the user interface program performed in the present invention.

When the user interface program 188 of FIG. 1 is executed by the computer 100, the user creates the device layout 212, selects the graphic objects 214 and provides the graphic connectors 216 by selecting appropriate buttons from device control menu 220. A general flow diagram of the user interface program 188 is shown in FIG. 3. The device control menu 220 includes a drawing button 227 (see FIG. 2). In step 300, if the user selects the drawing button 227, then the user interface program 188 provides a drawing program to the user in step 302. The use of the drawing program will be described in detail below. The drawing program is, for example, the "Microsoft Draw" program by Microsoft Corporation of Redmond, Wash. The Microsoft Draw program is a well-known drawing program which allows a user to draw simple graphic elements such as lines, circles, rectangles, and so forth.

Figure 4:
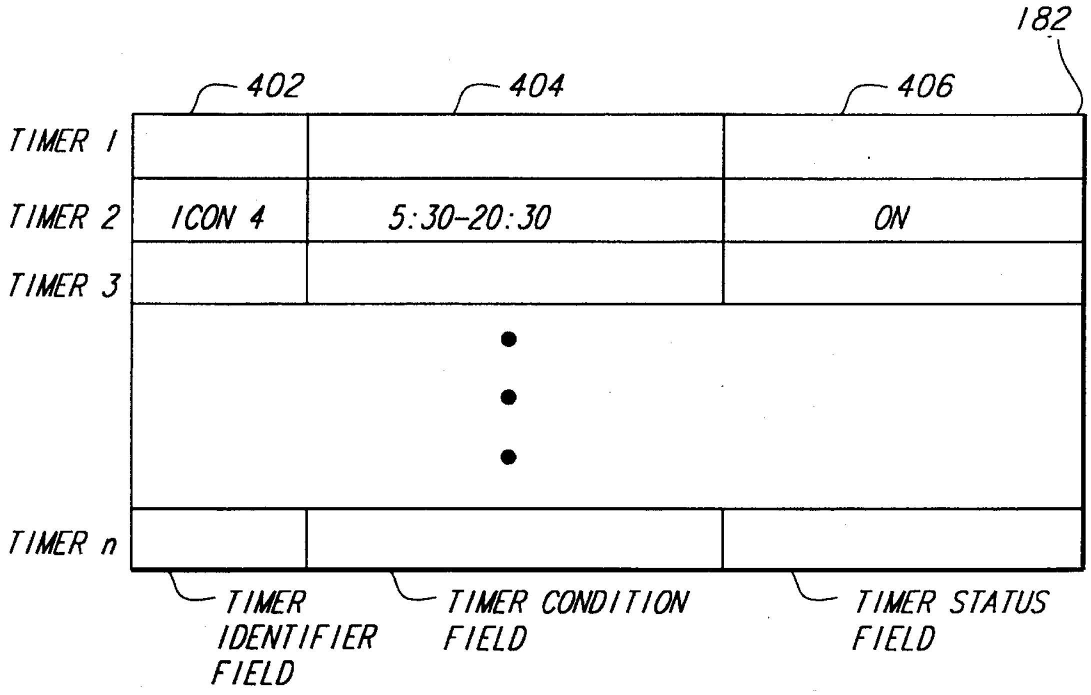
FIG. 4 is a timer status table used in the present invention.

The device control menu 220 contains a timer button 224. If in step 308 the user selects the timer button 224, step 310 is performed. In step 310, the user selects a "timer". A timer is an abstract, virtual device which has a status like the devices 130, which refer to physical devices. A timer has a status of ON when a computer clock/calendar circuit in the CPU 160 indicates that the time of day falls within a time range associated with the timer. The time range is defined by the user when the timer is defined by the user. Like a device 130, a timer may be depended on by a device 130 to determine the status of the device 130. When the user selects a timer, the user interface program 188 places a graphic object 214 representing the selected timer in the device representation area 210. The user interface program 188 defines a selected timer by adding an entry into a timer status table 182. The timer status table 182 is stored in the memory 180 in the computer 100 of FIG. 1. The timer status table 182 is shown in greater detail in FIG. 4. The timer status table 182 has a number of entries, one for each timer defined by the user. Each entry in the timer status table 182 includes a timer identifier field 402, a timer condition field 404, and a timer status field 406.

When a timer is selected by the user, a timer identifier is stored in the timer identifier field 402 in the timer status table 182. The timer identifier identifies the graphic object 214 representing the selected timer. The user interface program 188 obtains from the user a time range which defines the status of the timer. For example, the user selects a time range 5:30–20:30 which defines the status of the timer to be ON between the hours of 5:30 a.m. and 8:30 p.m. and OFF otherwise. This time range is stored in the timer condition field 404 contained in the entry in the timer status table 182 provided for the new timer selected by the user. The CPU 160 contains a clock/calendar circuit. The clock/calendar circuit is checked periodically to obtain the time of day. When the clock/calendar circuit provided by the CPU 160 indicates a time of day that falls within the time range stored in the timer condition field 404, the status stored in the timer status field 406 is set to ON. Otherwise, the status is set to OFF.

Returning to FIG. 3, the user can also select the devices 130 using the device control menu 220. The device control menu 220 contains a motion detector button 221, a light button 222, and a video camera button 223. If in step 312 the user selects the motion detector button 221, the light button 222, or the video camera button 223, the user interface program 188 defines a new device 130 in step 314. The user interface program 188 defines the new device by adding an entry for the new device into a device status table 183. The device status table 183 is stored in the memory 180 of the computer 100 shown in FIG. 1. The device status table 183 is shown in greater detail in FIG. 5. The device status table 183 contains a number of entries, one entry provided for each device 130 that has been defined by the user. Each entry in the device status table 183 contains a device identifier field 502, a device condition field 504, and a device status field 506.

Each device 130 has a status which indicates whether the device is activated (ON) or deactivated (OFF). The device identifier field 502 stores an identifier which identifies the graphic object 214 selected by the user to represent the device 130. One of ordinary skill will appreciate that a variety of information can be provided to identify and describe the devices 130. For example, the device identifier 502 can store a device name and description, a pointer to an icon bitmap of an icon representing the device 130, a set of graphic coordinates of the icon on the display screen, and so forth. This information can be provided by the user via the computer 100 or by the device 130 via the receiver 150 when the device is installed. In an embodiment of the invention, the device condition field 504 contains an identifier identifying each device 130 on which the status of the selected new device is to depend. For example, the device condition field 504 contains identifiers of the devices as operands in a logical operation, such as "Timer 2 OR Device 1" as shown in the example "Device 2" entry in the device status table 183. The device status field 506 stores the status of the selected device 130. In the above example wherein the device condition field 504 contains the logical operation "Timer 2" or "Device 1", the status of "Device 2" stored in the device status field 506 will be ON only if the status of the "Timer 2" or "Device 1" is ON. Otherwise, the status stored in the device status field 506 for "Device 2" will be OFF, as shown.

Returning to FIG. 3, the device control menu 220 also contains a graphic connector button 226. If in step 316 the user selects the graphic connector button 225, a dependency relationship is defined in step 318 between two devices 130 that have been previously selected by the user in step 312 of FIG. 3. The user defines interdependencies between two previously selected devices 130 by selecting a graphic connector 216. The graphic connector 216 represents a dependency relationship between two selected devices 130. The user draws the graphic connector 216 between graphic objects which represent the devices to define a dependency relationship. The user similarly defines a dependency relationship between a selected timer and a selected device 130. When the user provides a graphic connector 216 from a first graphic object 214 to a second graphic object 214, the user interface program 188 defines a dependency relationship between respective first and second devices 130. The user interface program 188 defines this dependency relationship by storing information in the device status table.

Figure 5:
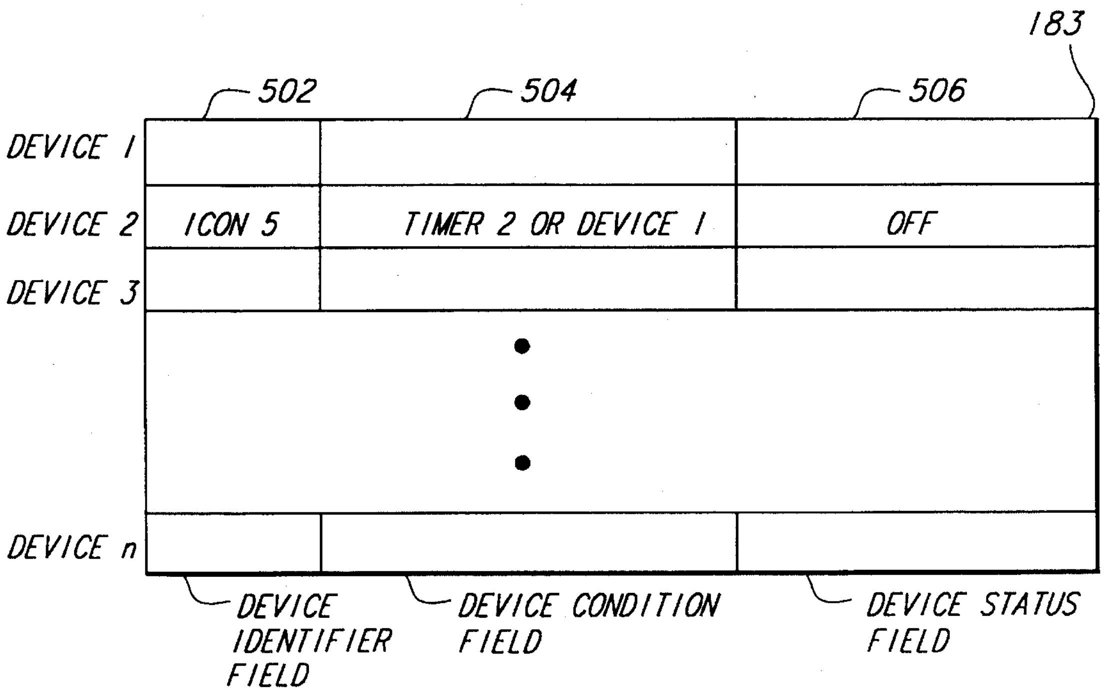
FIG. 5 is a device status table used in the present invention.

Where, for example, the device condition field contains identifiers of the conditions the device depends on, as explained with reference to FIG. 5 above, the user interface program 188 stores an identifier identifying the first device in the device condition field 504 of the entry in the device status table 183 for the second device. The user interface program 188 locates the entry for the second graphic device 130 in the device status table 183 with reference to the device identifier in the device identifier field 502. The user interface program 188 then writes an identifier identifying the first device into the device condition field 504 of that entry.

The user may define any number of dependency relationships between previously selected timers and devices 130. The user does so by providing any number of graphic connectors 216 between the graphic objects 214 that represent these devices. Where a device 130 depends on multiple other devices 130, the device condition field 504 for that device 130 contains respective multiple identifiers. In the embodiment of the invention illustrated in FIG. 5, the status of the device 130 which depends on the multiple devices 130 is defined by an "OR" operation of the status of each of the multiple devices 130. That is, if the status of any of the multiple devices 130 is ON, the status of the device 130 which depends on the multiple devices is ON. It will be readily apparent to one of ordinary skill in the art, however, that various and more complex logical relationships can be defined between the devices 130 in the device condition field 504. For example, combinations of logical operators such as AND, OR and NOT can be provided within the device condition field 504 which define the status of the device 130 stored in the device status field 506. The logical relationships are selected by the user in step 318 of the user interface program 188.

Returning again to FIG. 3, a preferred implementation of the device control menu 220 also includes a magnification button 226 which assists the user in the selection of timers and devices 130 and the interconnections therebetween. In step 304, if the magnification button 226 is selected, the user interface program 188 performs step 306. In step 306, the user interface program magnifies or demagnifies the device layout 212, graphic objects 214, and graphic connectors 216 in the device representation area 210. Finally, if the user selects the exit button 228, the user interface program 188 terminates. Otherwise, the user interface program 188 loops to continue to perform steps 300 through 320, as described above. The user may thereby define any number of timers and device 130, and any number of logical relationships therebetween.

Figure 6:
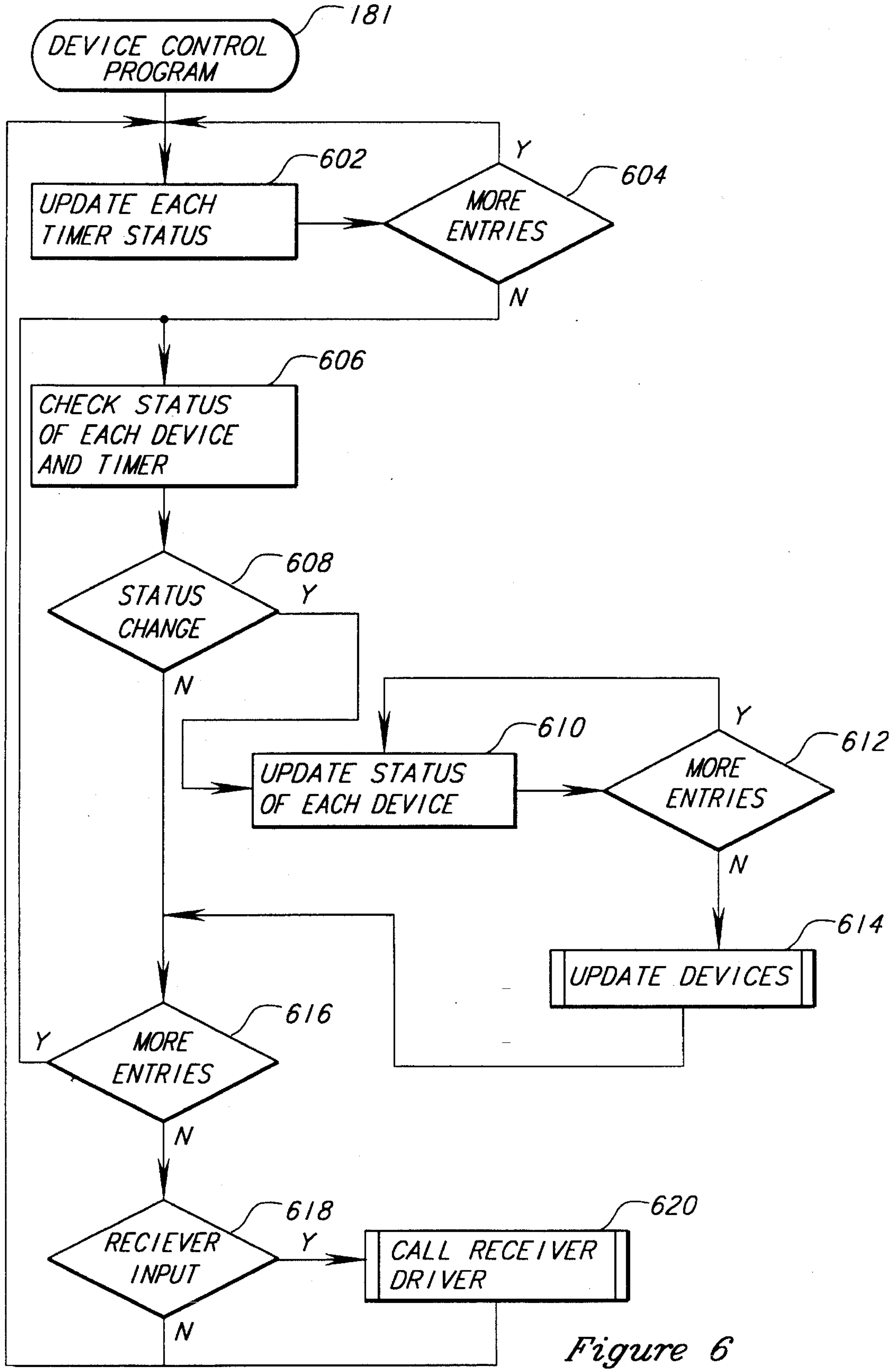
FIG. 6 is a flow diagram of the device control program performed in the present invention.

Once defined, the timers and devices 130 selected by the user are controlled by a device control program 181. The device control program 181 is stored in the memory 180 in the computer 100. A flow diagram of the device control program 181 in an embodiment of the invention is shown in FIG. 6. The flow diagram in FIG. 6 corresponds to the embodiment explained above with reference to FIG. 5, wherein the device condition field 504 contains identifiers of the devices the device depends on. The device control program 181 is continually executed by the CPU 160 of the computer 100 when the user interface program 188 is not in operation. The device control program 181 continually determines the status in the timer status fields 406 in the timer status table 182 and the device status fields 506 in the device status table 183. As will be explained, there are three ways a status of a timer or device 130 can change. The status of a timer changes when the time of day indicated by the calendar/clock circuit in the CPU 160 of the computer 100 changes into or out of the time range stored in the timer condition field 404 in the timer status table 182 provided for that timer. Secondly, the status of a device 130 changes when the status changes of a device 130 or timer having an identifier stored in the device condition field 504 in the device status table 183 provided for that device 130. Finally, the status of a device 130 can be changed by the device 130 itself by sending an appropriate signal to the computer 100 via the receiver 150. When the status of a timer or device changes in any of these three ways, the device control program 181 updates the status of all devices 130 which depend on the status of the device which has changed status.

In step 602, the device control program 181 updates the status of each timer as necessary. The device control program 181 compares the time of day to the time range in the timer condition field 404 for each entry in the timer status table 182. When the time of day changes into or out of a time range in the timer condition field 404, the device control program 181 updates the status of the timer status field 406 in the same entry. For example, the time range 5:30–20:30 is provided in the timer condition field in the example entry for "Timer 2" in FIG. 4. When the current time has changed form 5:29 to 5:30, the device control program 181 updates the status in the timer status field 406 from OFF to ON. Step 602 is performed for each entry in the timer status table 182 and is repeated as long as step 604 determines that more entries in the timer status table 400 exist for which step 602 has not been performed.

The device control program 181 next updates the status of each device 130 that depends on a timer or device 130 whose status has changed. In step 606, the device control program 181 checks the status of each device 130 and timer. The device control program 181 reads the status in the timer status field 406 for each entry in the timer status table 182 and reads the status in the device status field 506 for each entry in the device status table 183. If in step 608 the device control program 181 determines that this status has changed, then step 610 is performed. The device control program 181 determines whether a status has changed by, for example, maintaining a previous status of each timer and device 130, and comparing the status read to the corresponding previous status. In step 610, the device control program 181 locates each entry in the device status table 183 having in the device condition field 504 the timer or device 130 whose status has changed. The device control program 181 then updates the status in the device status field 506 of the located entry in the device status table 183. Step 610 is repeated as long as it is determined in step 612 that more entries exist which contain an identifier of a timer or device 130 whose status has changed in the device condition field 504. The device status table 183 is traversed multiple times until the statuses in all entries do not change. Infinite loops are prevented by, for example, preventing the user from defining circular dependency relationships in step 318 of FIG. 3.

The device control program 181 then updates the actual devices 130. The device control program 181 updates the devices by calling the routine "Update Devices" in step 614. As will be explained in greater detail below, the Update Devices routine updates each device 130 by activating or deactivating the device 130 based on the status of the device 130. Steps 606 through 614 are repeated as long as step 616 determines that more entries exist in the timer status table 182 and the device status table 183 from which the timer status field 406 or device status field 506 has yet to be read. The device control program 181 is shown for simplicity of explanation as updating the devices 130 each time a status change is first detected. However, one of ordinary skill in the art will recognize that, prior to updating the devices 130, the status of each device can be again determined to determine the effect of the status change on the status of other devices 130. This determination can be made for all affected devices 130 until the status of devices 130 is no longer affected by the original status change. Then, the devices can be updated as in step 614.

The device control program 181 next determines whether a device 130 has sent a signal to the computer 100 to change the status of that device 130. In step 618, the device control program 181 determines whether input has been received from the devices 130 via the receiver 150. The receiver 150 receives a signal from a device 130 over a medium such as infrared, radio frequency or the like. The signal is sent, for example, by a transmitter at the device 130. If so, the device control program 181 calls a receiver driver routine in step 620. As will be explained in greater detail below, the receiver driver routine determines the status of the device 130 from which the signal was received, and updates the device status field 506 in the device status table 183 to reflect the status received. The device control program 181 then loops to continue to perform steps 602 through 620, as appropriate.

As explained above, the flow diagram of FIG. 6 corresponds to an embodiment of the invention wherein the device condition field 504 for each device 130 identifies the devices that device depends on. In an alternative embodiment, the device condition field 504 may contain identifiers of the devices which depend on that device. Similarly, the timer condition field 404 for each timer contains identifiers of the devices which depend on that timer, the time range on which the timer depends being stored separately. In this alternative embodiment, each time the status of a device 130 changes, the device control program 181 determines the devices 130 affected by the status change from the device status field 504 and updates those devices 130. Similarly, each time the status of a timer changes, the device control program 181 determines the affected devices 130 from the timer status field 404 and updates those devices 130.

Figure 7:
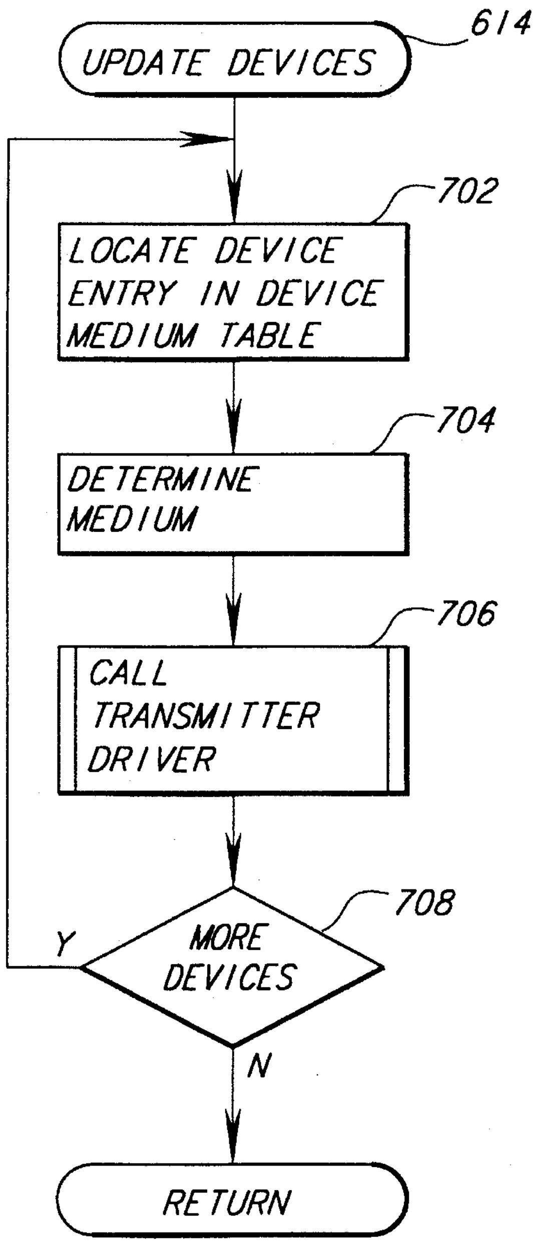
FIG. 7 is a flow diagram of the "Update Devices" routine performed by the device control program in the present invention.
Figure 8:
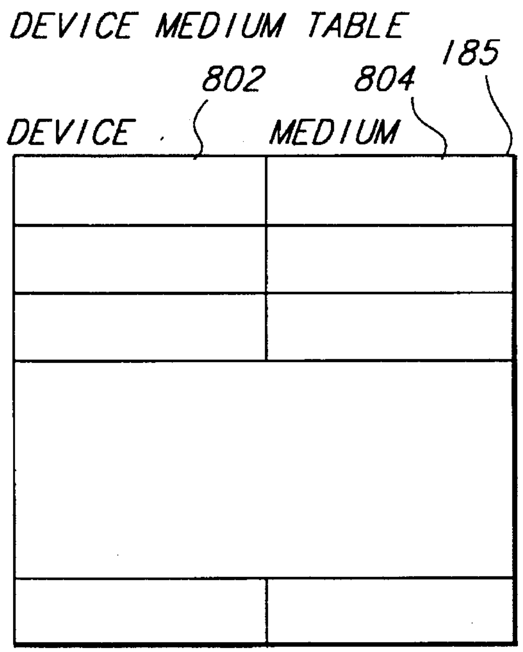
FIG. 8 is a device medium table used in the present invention.

As explained above, the device control program 181 updates the actual devices 130 when the status of the devices 130 changes. The device control program 181 updates the devices 130 by calling the update devices routine in step 614 of FIG. 6. A flow diagram is shown in FIG. 7 of the Update Devices routine. In step 702 the routine locates an entry in a device medium table 185 which corresponds to each device whose status has changed. The device medium table 185 is stored in the memory 180 of the computer 100 from FIG. 1. The device medium table 185 is shown in more detail in FIG. 8. As shown in FIG. 8, the device medium table 185 contains an entry for each device 130. The entry for each device 130 contains a device field 802 and a medium field 804. The device field 802 stores an identifier which identifies the device 130. One of ordinary skill in the art will appreciate that the signal provided by the computer 100 to a given device 130 via one of the transmitters 140 can be a signal in many possible media, such as infrared, radio frequency, X-10, and so forth. The medium field 804 identifies the medium over which commands are transmitted and received between the computer 100 and the device 130 in that entry.

Returning to FIG. 7, the routine determines in step 704 the medium over which the updated status is to be transmitted to the device 130. The medium determined is the medium which is stored in the entry in the device medium table 185 for the device 130. In step 706, the routine calls a transmitter driver routine which corresponds to a transmitter that transmits over the S medium determined in step 704. As will be explained in greater detail below, the transmitter transmits a signal over the determined medium to the device 130. The transmitted signal activates or deactivates the device 130 as indicated by the signal. In step 708, control loops to continue to perform steps 702 through 706 as long as more devices exist to be updated.

Figure 9:
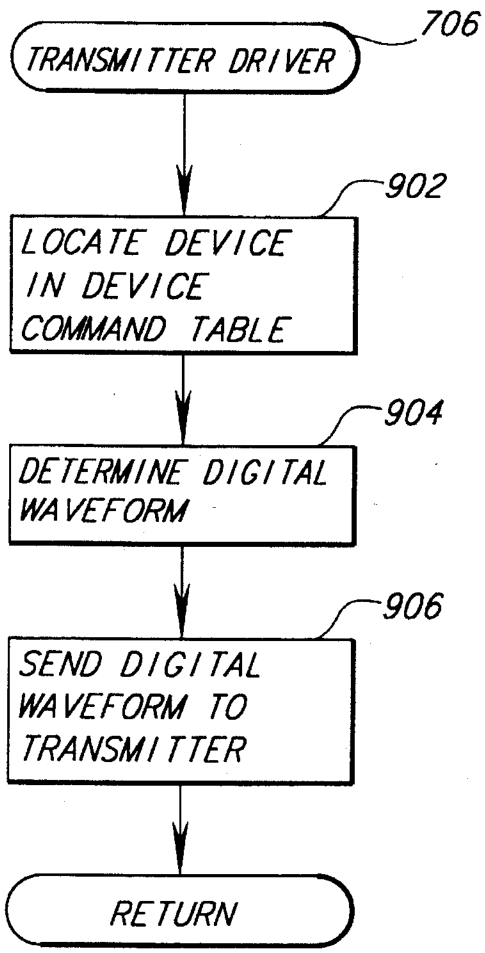
FIG. 9 is a flowchart of the "Transmitter Driver" routine performed by the Update Devices routine in the present invention.

The transmitter driver routine is illustrated by the flow chart shown in FIG. 9. The transmitter driver routine is called in step 706 of the update devices routine. Where the computer system FIG. 1 includes multiple transmitters 140 transmitting over different media, a transmitter driver routine is provided for each transmitter 140. That is, a transmitter driver may be provided for a transmitter 140 transmitting a signal in infrared, radio frequency, X-10, or the like. The transmitter driver routine provides a digital waveform to the transmitter 140 corresponding to the determined medium. The digital waveform is translated by the transmitter 140 into a signal suitable for transmission over the determined medium. The transmitter 140 transmits the signal over the particular medium for the device 130. For example, where the determined medium is infrared, the transmitter driver used is an infrared driver which provides a digital waveform to an infrared transmitter, which translates a digital waveform into an infrared signal and sends the infrared signal to the device 130.

Figure 10:
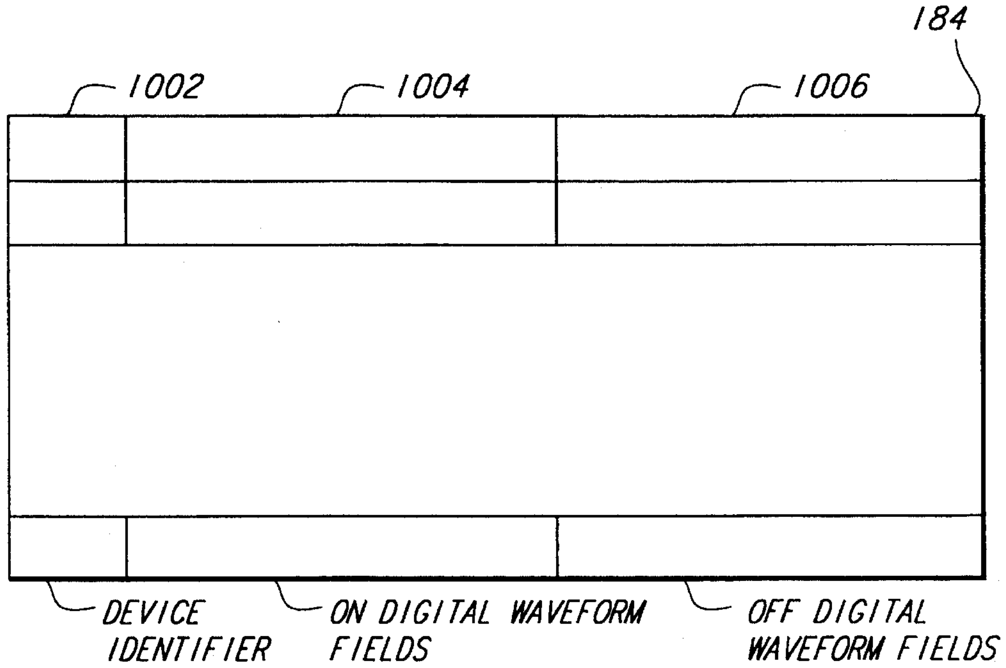
FIG. 10 is a device command table used in the present invention.

In step 902, the transmitter driver locates the device 130 whose status is to be updated in a device command table 184 provided for the determined medium. The device command table 184 is stored in the memory 180 of the computer 100 of FIG. 1. Where the computer system of FIG. 1 includes multiple transmitters 140 transmitting over different media, a device command table 184 is provided for each transmitter 140. The device command table 184 is shown in greater detail in FIG. 10. In FIG. 10, the device command table 184 contains a number of entries provided for a corresponding number of devices 130. The devices 130 communicate with the computer 100 over the medium for which the device command table 184 is provided. Each entry in the device command table 184 includes a device identifier 1002 which identifies the device 130. In the case of some media, such as X-10, only one set of signals is provided to which all devices 130 must conform. In such a case, the device command table 184 would only have a single entry. Also, one of ordinary skill in the art will recognize that the device identifier 1002 may identify a device "type". The device type corresponds to any number of devices 130 using a same set of signals each to represent a same status when transmitted to the device. The device type is stored with each device as, for example, an entry in the device status table 183 shown in FIG. 5.

Each entry in the device command table 184 also includes an ON digital waveform field 1004 and an OFF digital waveform field 1006. For each device 130 identified by the device identifier 1002, a digital waveform is stored in the ON digital waveform field 1004. The digital waveform stored in the ON digital waveform field 1004 corresponds to a signal which must be provided by the transmitter 140 to activate the identified device 130 over the corresponding medium. Likewise, the digital waveform stored in the OFF digital waveform field 1006 corresponds to a signal which must be provided to the identified device 130 to inactivate the identified device 130. The ON digital waveform and OFF digital waveform are provided, for example, by the device 130 via the receiver 150. One of ordinary skill in the art will recognize that, where more complex devices 130 are provided, additional commands besides ON and OFF may also be sent to the devices 130 based on the status of other devices 130 and times. For example, when a device 130 is a video cassette recorder, a changed status of times and/or devices 130 may cause the transmitter 140 to send an ON signal, a REWIND signal, and a RECORD signal. In step 904, the transmitter driver routine determines the digital waveform which must be provided based on the updated status in the entry for the located device and device command table 184. In step 906, the transmitter driver routine provides the digital waveform to the appropriate transmitter 140. The transmitter 140 then transmits to a receiver at the device 130 the signal necessary to activate or deactivate the device 130.

Figure 11:
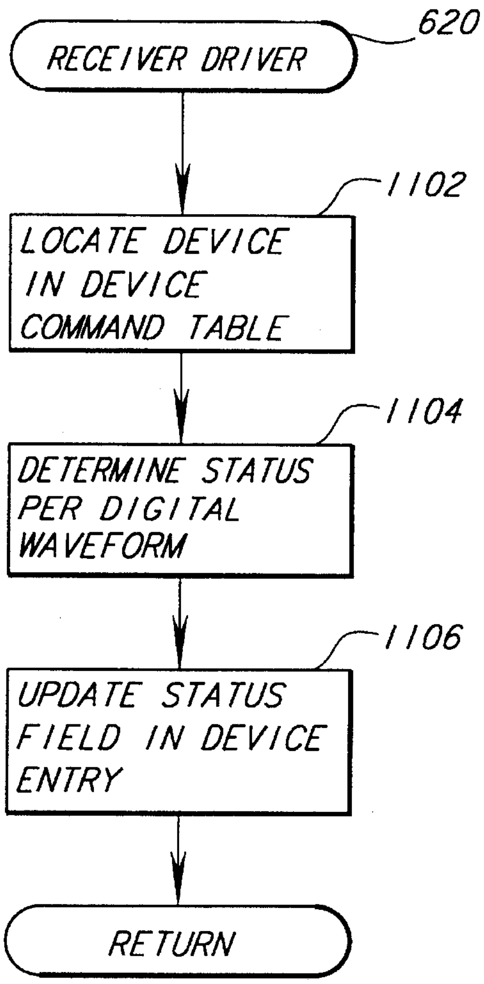
FIG. 11 is an illustration of the "Receiver Driver" routine performed by the device control program in the present invention.

As noted above, the status of a device 130 can be changed based on a signal received from the device 130 itself. When the computer 100 receives a signal from a device 130 via the receiver 150, the device control program 181 performs a receiver driver routine. FIG. 11 is a flow diagram of the receiver driver routine. The receiver driver routine shown in FIG. 11 is called in step 620 of the device control program shown in FIG. 6. The receiver driver routine corresponds to a receiver 150 which receives signals over a particular medium. When multiple receivers 150 are provided, respective multiple receiver drivers are provided in the present invention. In step 1102, the receiver driver locates the device 130 from which the signal has been transmitted in the appropriate device command table 184 provided for the medium to which the receiver driver routine corresponds. Alternatively, the receiver device locates the appropriate device type, as discussed above with respect to FIG. 10. The device command table 184 corresponds to the medium over which the signal has been transmitted. In step 1104, the receiver driver routine determines whether the updated status is ON or OFF, depending on the digital waveform received from the receiver 150. The receiver driver then returns.

Although the present invention has been described with reference to a specific embodiment, it should be appreciated that one of ordinary skill in the art may make various changes without departing from the spirit of the invention. For example, the information stored in the timer status table 182, the device status table 183, the device command table 184, and the device medium table 185 can be provided in many different tables, a single table, and so on. The devices 130 in the device condition field 504 could, for example, be stored in a separate table listing for each "source" device 130 all "target" devices 130 affected when the status of the source device 130 changes. Also, the computer system shown in FIG. 1 may be provided through a television system, wherein the display 120 is a television monitor and the input device 110 is a remote control. In such a case, the remote control communicates with the computer 100 via the receiver 150 instead of through a direct connection to the I/O 120 as does the input device 110 shown in FIG. 1. Many other embodiments of the invention described may be realized. The scope of the invention is to be defined only by the claims.

We claim:

1. A method of providing a user with selectively interdependent control of devices, the method performed by a computer and comprising the steps of:

providing the user with a choice of devices that can be selected to depend on each other, each device having a status;

obtaining from the user an identification of a first device and a second device and an indication that the status of the second device depends on the status of the first device;

obtaining from the user a dependency relationship that defines how the status of the second device depends on the status of the first device;

using the computer, determining whether the status of the first device has changed;

using the computer, updating the status of the second device when the status of the first device has changed, the updated status of the second device based on the changed status of tile first device and the dependency relationship defined by the user; and using the computer, controlling the second device based on the updated status of the second device.

2. The method of claim 1, further comprising the steps of:

storing a first device entry for the first device in a table, the first device entry including a status field which contains the status of the first device; and storing a second device entry for the second device in the table, the second device entry including a status field which contains the status of the second device and a condition field which identifies the first device to indicate that the status of the second device depends on the status of the first device.

3. The method of claim 2, further comprising the steps of:

obtaining from the user an identification of a third device having a status;

obtaining from the user a definition of a dependency relationship wherein the status of the second device depends on a logical relationship between the first and third device;

storing in the condition field of the second device entry an indication of a logical operation between the status of the first device and the status of a third device; and wherein:

the step of updating the stored status of the second device comprises determining the status of the second device based on a result of the logical operation and storing the determined status in the status field in the second device entry.

4. The method of claim 1, further comprising the steps of:

storing in a table a first device entry for the first device having a status field which contains the status of the first device; and storing in the table a second device entry for the second device having a status field storing the status of the status of the second device; and wherein the step of determining whether the stored status of the first device has changed comprises repeatedly determining whether the status contained in the status field in the first device entry has changed; and the step of updating the stored status of the second device comprises updating the status in the status field in the second device entry when the status in the status field in the first device entry changes.

5. The method of claim 1, further comprising the step of storing a status which depends on whether a time indicated by a clock/calendar circuit provided by the computer falls within a time range indicated by the user; and wherein the step of updating the stored status of the second device comprises updating the status of the second device when the clock/calendar circuit indicates a time which has changed into or out of the user indicated time range.

6. The method of claim 1 wherein the step of controlling the second device comprises activating or deactivating the second device based on the updated status of the second device by providing the updated status of the second device to a transmitter, and thereby transmitting a signal to the second device to activate or deactivate the second device corresponding to the updated status of the second device.

7. The method of claim 6 wherein the step of activating or deactivating the second device further comprises determining a medium over which the signal is to be transmitted and providing a digital waveform to the transmitter for transmitting a signal corresponding to the digital waveform over the determined medium.

8. The method of claim 1, further comprising the steps of:

determining a medium over which the signal is to be transmitted; and storing in a table an entry for the second device, the entry storing a digital waveform corresponding to a signal to be transmitted over the determined medium to indicate the updated status of the device; and wherein:

the step of activating or deactivating the second device further comprises locating the entry for the second device in the table and providing to the transmitter the digital waveform stored in the located entry which corresponds to the updated status of the second device.

9. The method of claim 1 wherein the step of obtaining the identification of the first device and the second device comprises:

providing a graphical user interface that includes graphical objects corresponding to devices;

obtaining an indication of a first graphic object from the user entered into the computer via the graphical user interface, the first graphic object corresponding to the first device and being displayed on a display of the graphic user interface; and obtaining an indication of a second graphic object from the user entered into the computer via the graphical user interface, the second graphic object corresponding to the second device and being displayed on the display.

10. The method of claim 9 wherein the step of controlling the second device comprises activating or deactivating the second device based on the updated status of the second device by providing the updated status of the second device to a transmitter, and thereby transmitting a signal to the second device to activate or deactivate the second device corresponding to the updated status of the second device.

11. The method of claim 10 wherein the step of activating or deactivating the second device further comprises determining a medium over which the signal is to be transmitted and providing a digital waveform to the transmitter for transmitting a signal corresponding to the digital waveform over the determined medium.

12. The method of claim 10, further comprising the steps of:

determining a medium over which the signal is to be transmitted; and storing in a table an entry for the second device, the entry storing a digital waveform corresponding to a signal to be transmitted over the determined medium to indicate the updated status of the device; and wherein the step of activating or deactivating the second device further comprises locating the entry for the second device in the table and providing to the transmitter the digital waveform stored in the located entry which corresponds to the updated status of the second device.

13. A computer system for user-selected interdependent control of devices, the computer system comprising:

means providing the user with a choice of devices that can be associated with each other;

means for obtaining from the user an identification of a first device and a second device and an indication that a status of the second device depends on a status of the first device;

means for obtaining from the user a dependency relationship that defines how the status of the second device depends on the status of the first device;

means for storing the status of the first device and the status of the second device;

means for determining whether the stored status of the first device has changed;

means for updating the stored status of the second device when the status of the first device has changed, the updated status of the second device based on the changed status of the first device and the dependency relationship defined by the user; and means for controlling the second device based on the updated status of the second device.

14. The computer system of claim 13 wherein the means for obtaining an identification a first device and a second device comprises;

a graphical user interface provided to the user for selection of the first device and the second device, the graphical user interface including:

means for obtaining an indication of a first graphical object from the user, the first graphic object corresponding to the first device and being displayed on a display of the graphic user interface; and means for obtaining an indication of a second graphic object from the user, the second graphic object corresponding to the second device and being displayed on the display.

15. The computer system of claim 14 wherein the means for controlling the second device comprises:

a transmitter which transmits a signal to the second device; and means for providing the updated status of the second device to the transmitter to transmit the signal to the second device to activate or deactivate the second device corresponding to the updated status of the second device.

16. The computer system of claim 15 wherein the means for controlling the second device further comprises:

means for determining a medium over which the signal is to be transmitted; and means for providing a digital waveform to the transmitter for transmitting a signal corresponding to the digital waveform over the determined medium.

17. The computer system of claim 15, further comprising:

means for determining a medium over which the signal is to be transmitted; and means for storing in a table an entry for the second device having a digital waveform corresponding to a signal to be transmitted over the determined medium to indicate the updated status of the device; and wherein the means for controlling the second device further comprises means for locating the entry for the second device in the table and providing to the transmitter the digital waveform stored in the located entry which corresponds to the updated status of the second device.

18. A computer system for user-selected interdependent control of devices, the computer system comprising:

a receiver;

a transmitter;

a computer connected to the receiver and the transmitter, the computer including:

a graphical user interface provided to the user for selection of a first device and a second device, the first and second devices each having a status, the graphical user interface, including:

means for obtaining an indication of a first graphic object from the user, the first graphic object corresponding to the first device and being displayed on a display of the graphic user interface;

means for obtaining an indication of a second graphic object from the user, the second graphic object corresponding to the second device and being displayed on the display; and means for obtaining an indication that the status of the second device depends on the status of the first device; and means for updating the status of the second device, when the receiver sends a signal to the computer indicating that the status of the first device has changed, by providing the updated status to the transmitter which sends a corresponding signal to the second device.

19. The computer system of claim 18 wherein the computer includes means for determining a medium over which the signal is to be transmitted and for selecting the transmitter from among plural transmitters to send the updated status via the determined medium.

20. The computer system of claim 19 wherein the computer comprises a memory storing a table having for each device an entry containing a digital waveform corresponding to the signal transmitted over the medium by the transmitter, the computer providing to the transmitter the digital waveform corresponding to the determined medium.

21. The method of claim 9 wherein the step of obtaining an indication that the second device is to be associated with the first device includes providing a graphic connector as part of the graphic user interface and obtaining from the user a selection of the graphic connector indicating an association of the second device with the first device.

22. The method of claim 9, further comprising:

providing a drawing utility that enables the user to draw a graphical representation of a structure in which the devices are located; and displaying the first and second graphic objects within the graphical representation at locations that correspond to locations within the structure at which the first and second devices are found.

23. The method of claim 18 wherein the means for indicating that the second device is to be associated with the first device includes a graphic connector and means for positioning the graphic connector to indicate an association of the second device with the first device

24. A method of providing a user with selectively interdependent control of devices, the method performed by a computer and comprising:

providing the user with a choice of devices that can be selected to depend on each other, each device having a status;

providing a graphical user interface that includes a display that displays graphic objects corresponding to the devices;

obtaining an indication of a first graphic object from the user entered into the computer via the graphical user interface, the first graphic object corresponding to a first device having a status;

obtaining an indication of a second graphic object from the user entered into the computer via the graphical user interface, the second graphic object corresponding to a second device having a status;

obtaining from the user an indication that the status of second device depends on the status of the first device and a dependency relationship that defines how the status of the second device depends on the status of the first device;

using the computer, determining whether the status of the first device has changed;

using the computer, updating the status of the second device when the status of the first device has changed, the updated status of tile second device based on the changed status of the first device and the dependency relationship defined by the user; and using the computer, controlling the second device based on the updated status of the second device.

25. The method of claim 24 wherein the step of obtaining an indication that the status of second device depends on the status of the first device includes providing a graphic connector as part of the graphic user interface and enabling the user to position the graphic connector to indicate that the status of the second device depends on the status of the first device.

26. The method of claim 24, further comprising:

providing a drawing utility that enables the user to draw a graphical representation of a structure in which the devices are located; and displaying the first and second graphic objects within the graphical representation at locations that correspond to locations within the structure at which the first and second devices are found.

27. The method of claim 24, further comprising:

storing a first device entry for the first device in a table, the first device entry including a status field which contains the status of the first device; and storing a second device entry for the second device in the table, the second device entry including a status field which contains the status of the second device and a condition field which identifies the first device to indicate that the status of the second device depends on the status of the first device.

28. The method of claim 27, further comprising:

storing an indication of the first graphic object in a graphic object field of the first device entry of the table.

* * * * *

UNITED STATES PATENT AND TRADEMARK OFFICE

CERTIFICATE OF CORRECTION

PATENT NO. : 5,467,264

DATED : November 14, 1995

INVENTOR(S) : Rauch et al.

It is certified that error appears in the above-indentified patent and that said Letters Patent is hereby corrected as shown below:

In column 13, claim 8, line 7, please delete "1" and insert therefor --6--.

In column 13, claim 9, lines 22 and 23, please delete "graphical" and insert therefor --graphic--.

In column 16, claim 24, line 22, please delete "tile" and insert therefor --the--.

Signed and Sealed this

Nineteenth Day of March, 1996

*Attest:*

BRUCE LEHMAN

*Attesting Officer*

*Commissioner of Patents and Trademarks*